(12) United States Patent
Kielkowski et al.

(10) Patent No.: US 12,375,125 B2
(45) Date of Patent: Jul. 29, 2025

(54) METHODS AND SYSTEMS FOR DATA COMMUNICATIONS IN HVAC SYSTEMS

(71) Applicant: Carrier Corporation, Palm Beach Gardens, FL (US)

(72) Inventors: Ron Kielkowski, Indianapolis, IN (US); Gerald P. Hunt, Indianapolis, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 43 days.

(21) Appl. No.: 18/176,122

(22) Filed: Feb. 28, 2023

(65) Prior Publication Data
US 2023/0283320 A1 Sep. 7, 2023

Related U.S. Application Data

(60) Provisional application No. 63/268,860, filed on Mar. 4, 2022.

(51) Int. Cl.
*H04L 25/00* (2006.01)
*F24F 11/50* (2018.01)
*H04B 3/02* (2006.01)
*H04L 12/40* (2006.01)

(52) U.S. Cl.
CPC ............... *H04B 3/02* (2013.01); *F24F 11/50* (2018.01); *H04L 12/4013* (2013.01)

(58) Field of Classification Search
CPC ......... G01N 21/3504; G01N 2133/003; G01N 2201/02; H04K 3/94; H04K 3/45; H04B 3/54; G01R 31/083; G01R 31/50
USPC ...................................................... 375/257
See application file for complete search history.

(56) References Cited

U.S. PATENT DOCUMENTS

| | | | | |
|---|---|---|---|---|
| 11,990,952 | B2* | 5/2024 | Arduini | H04L 12/10 |
| 2003/0222603 | A1* | 12/2003 | Mogilner | H05B 47/185 |
| | | | | 315/312 |
| 2004/0066245 | A1* | 4/2004 | Crenella | H04B 3/542 |
| | | | | 333/24 R |
| 2007/0220907 | A1* | 9/2007 | Ehlers | F25B 49/005 |
| | | | | 62/126 |
| 2015/0349918 | A1* | 12/2015 | Mijarez Castro | H04L 1/243 |
| | | | | 375/227 |
| 2016/0323980 | A1* | 11/2016 | Weber | H05B 47/175 |
| 2017/0295058 | A1* | 10/2017 | Gottschalk | H04L 41/0803 |
| 2020/0386434 | A1* | 12/2020 | Blair | F24F 11/65 |
| 2022/0046114 | A1* | 2/2022 | Entelis | H04L 12/40 |
| 2024/0133570 | A1* | 4/2024 | Mannfeld | F24F 11/50 |

* cited by examiner

*Primary Examiner* — Khai Tran
(74) *Attorney, Agent, or Firm* — Souad Hakim

(57) ABSTRACT

An HVAC system is disclosed. In some embodiments, the HVAC system comprises a first component comprising a first communication module; a second component comprising a second communication module, the second component configured to communicate with the first component. The second communication module is configured to receive a first set of information over a power line and a second set of information over a communication line.

15 Claims, 2 Drawing Sheets

---

200

SENDING A FIRST SET OF DATA TO A FIRST COMMUNICATION MODULE, THE FIRST COMMUNICATION MODULE BEING CONFIGURED TO SEND THE FIRST SET OF DATA TO THE SECOND COMMUNICATION MODULE OVER A POWER LINE 202

SENDING A SECOND SET OF DATA TO THE SECOND COMMUNICATION MODULE OVER A COMMUNICATION LINE 204

METHODS AND SYSTEMS FOR DATA COMMUNICATIONS IN HVAC SYSTEMS

CROSS REFERENCE TO A RELATED APPLICATION

The application claims the benefit of U.S. Provisional Application No. 63/268,860 filed Mar. 4, 2022, the contents of which are hereby incorporated in their entirety.

BACKGROUND

The invention relates generally to data communications in HVAC systems and, more specifically, to an improved data communications bus for HVAC systems.

Some heating, ventilation, and air conditioning (HVAC) equipment pass both command signals and equipment operating data between the wall control, indoor units, and outdoor units over standard 4 conductor 24v HVAC wiring. This wire style has been in use for decades for HVAC and many buildings have this type of wire already installed. The data speed and throughput of signals sent by the equipment is may be limited on this type of wire. This invention overcomes these problems and allows greatly increased speed (e.g., near gigabit speed) over this same wiring.

BRIEF DESCRIPTION

Aspects of the disclosure relate to methods, apparatuses, and/or systems for data communications in HVAC systems.

In some embodiments, an HVAC system comprises a first component comprising a first communication module; a second component comprising a second communication module, the second component configured to communicate with the first component. The second communication module is configured to receive a first set of information over a power line and a second set of information over a communication line.

In some embodiments, the second communication module comprises a serial communication bus configured to receive power and the first set of information from the first communication module over the power line.

In some embodiments, the serial communication bus is a 4-wire communications bus comprising a RS-485 protocol on two wires.

In some embodiments, the 4-wire communications bus comprises a power line communication (PLC) protocol on two wires.

In some embodiments, the first communication module comprises a power line communication (PLC) transceiver configured to transmit the first set of information to the serial communication transceiver over the power line.

In some embodiments, the first set and second set of information are sent simultaneously.

In some embodiments, the first set of information is transmitted at high-speed transmission rate and the second set of information is transmitted at a standard speed transmission rate.

A method for communication between components of an HVAC system is provided. The method comprises: sending a first set of information to a first communication module, the first communication module being configured to send the first set of information to a second communication module over a power line; and sending a second set of information to the second communication module over a communication line.

A communication system for communication between components of an HVAC system is provided. In some embodiments, the system comprises a controller; a first communication module operatively connected to the controller; and a second communication module operatively connected to the controller and the first communication system, wherein the controller is configured to: send a first set of information to the first communication module, the first communication module being configured to send the first set of information to the second communication module over a power line; and send a second set of information to the second communication module over a communication line.

In some embodiments, the communication system is configured such that the second communication module comprises a serial communication bus configured to receive power and the first set of information from the first communication module over the power line.

In some embodiments, the communication system is configured such that the serial communication bus is a 4-wire communications bus comprising a RS-485 protocol on two wires.

In some embodiments, the communication system is configured such that the 4-wire communications bus comprises a power line communication (PLC) protocol on two wires.

In some embodiments, the communication system is configured such that the first communication module comprises a power line communication (PLC) transceiver configured to transmit the first set of information to the serial communication transceiver over the power line.

In some embodiments, the communication system is configured such that the first set and second set of information are sent simultaneously.

In some embodiments, the communication system is configured such that the first set of information is transmitted at high-speed transmission rate and the second set of information is transmitted at a standard speed transmission rate.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

Figure 1:
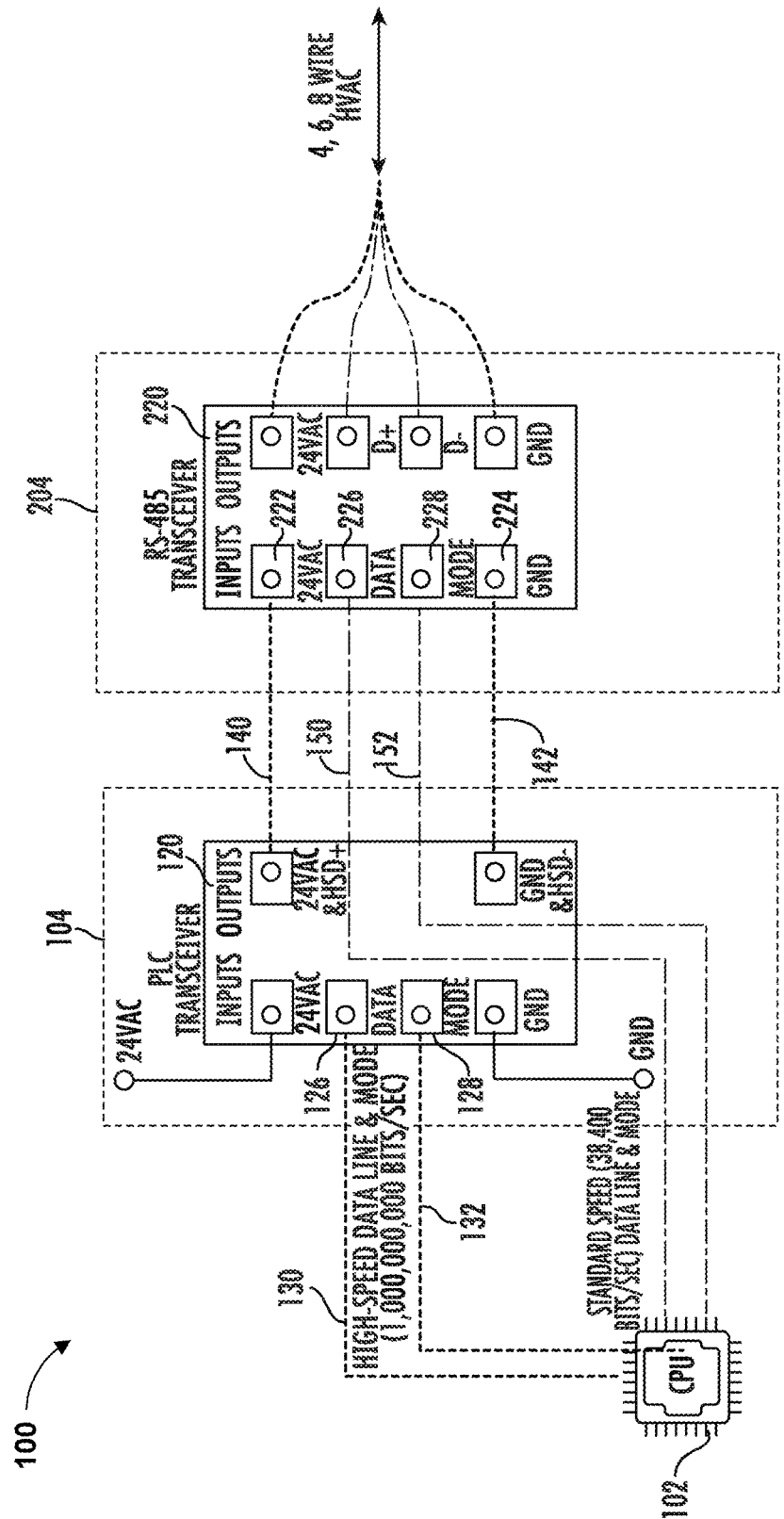
FIG. 1 illustrates an exemplary communication system between HVAC components, in accordance with to one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure, in accordance with some embodiments, describes systems and methods for data communications in an HVAC system. In some cases, data (or information) collection from HVAC systems may allow for better control of the equipment, real-time equipment monitoring, and/or early predictions of failures. These advantages may translate into an increase in efficiency for the equipment, pro-active control, and comfort for the building occupants. However, in some cases, the increase demand for data from the equipment may be challenging. In some cases, while the electronics may support higher data throughput, the physical wiring which connects indoor and outdoor equipment to the wall control and thermostat (and ultimately to the cloud) has not changed for decades. Many buildings use simple multi conductor HVAC wire running between the HVAC equipment and wall controls. In some cases, some HVAC equipment may be configured to pass digital signals using an RS-485 communications system. This system allows for low-speed data communication between the wall control, indoor, and outdoor equipment. In some instances, the communication system may be hindered by the standard HVAC wiring which connects the equipment and the wall control. The methods and systems described in the present disclosure may provide high-speed data communications over existing wiring systems. In some embodiments, the present communication system may provide communication with newer equipment having a high-speed bus, while maintaining communications with existing equipment (e.g., having RS-485 communications bus).

In some embodiments, an HVAC equipment may include 4 wires used for data communications, Power, Ground, Data+, and Data−. Of these lines, Data+ and Data− are used to carry the low-speed, standard RS-485 data. The power line is used to power the wall control and comes from the indoor unit. This same power line is carried to the outdoor unit although it is generally not used. The present disclosure takes advantage of the power and ground lines of the 4-wire system. Power Line Communications (PLC) technology may allow digital/data signals to be sent over power lines. In some embodiments, PLC technology may allow for data transmission at or near gigabit speed rates using standard 2-conductor wiring. This includes the 2 wires represented by Power and Ground of the HVAC equipment. It should be appreciated that other data transmission speeds may be possible using the invention described herein.

In some embodiments, the communication system of the present disclosure may be configured such that, while the PLC high-speed communications is occurring over the Power and Ground line of the 4-wire system, the low-speed RS-485 communication can also be occurring on the Data+ and Data-lines. In some embodiments, the high speed and low speed communications may occur approximately simultaneously (e.g., within milliseconds of one another). This may allow the standard HVAC wire to communicate with both RS-485 controlled equipment as well as HVAC equipment which contains the additional PLC transceivers. This may be advantageous because both new high-speed HVAC equipment and existing RS-485 HVAC equipment can co-exist on existing wiring of the building.

FIG. 1 illustrates a communication system 100 between HVAC components according to one or more embodiments. In some embodiments, communication system 100 may be configured to provide communication between communications module 104 of a first HVAC component and communication module 204 of a second HVAC component. In some embodiments, the HVAC components may include one or more of a thermostat, an outdoor unit, an indoor unit, a furnace, an air handler, an air conditioner one or more sensors, and/or any other components of an HVAC system configured to communicate between them. In some embodiments, the one or more components of the HVAC system may include one or more controllers configured for controlling operations of the components and communications between them. The controllers may include a processor(s) and an associated memory. The processor(s) may include a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be, but is not limited to, a random-access memory (RAM), read only memory (ROM), or other electronic, optical, magnetic or any other computer readable medium. The memory may store executable instructions, that when executed by the processor(s), cause the controllers to perform one or more or operations described herein.

Communications module 104 may be configured to provide communications between the first component and the second component. In some embodiments, communications module 104 may include a controller 102 and a transceiver 120. In some embodiments, controller 102 may be configured to send data, destined for communications module 204, to transceiver 120. In some embodiments, transceiver 120 may be a power line communications (PLC) transceiver. In these cases, controller 102 may be configured to transmit a first set of data to the PLC transceiver 120 over communication lines 130 and 132 (Data line and Mode). The PLC may be configured to receive the first set of data at a Data and Mode inputs (126, 128). In some embodiments, the first set of data is a high-speed data (HSD+, HSD−). In some embodiments, the high-speed data may be transmitted at or near 1 Gigabit/sec. For example, between about 0.2 and 1.5 Gigabit/sec.

In some embodiments, PLC transceiver 120 may be configured to transmit the first set of data to communications module 204. In some embodiments, the first data is transmitted over power lines 140 and 142 connecting a 24 V AC/HSD+ and a Ground/HSD-outputs of the PLC transceiver 104 to communications module 204. In some embodiments, using the PLC technology allows for digital/data signals to be sent over power lines. This may be advantageous, because it provides high speed data transmission using standard 2-conductor wiring. This includes the 2 wires (represented here by Power and Ground) of the HVAC equipment.

Communications module 204 may be configured to provide communications between the first component and the second component. In some embodiments, communications module 204 may include a transceiver 220. In some embodiments, transceiver 220 may be configured to receive data from communication module 104. In some embodiments, transceiver 220 may include a serial communication bus. In some embodiments, transceiver 220 may be a RS-485 transceiver which includes a 4-wire communications bus. In some embodiments, the 4-wire communications bus includes a RS-485 protocol on two wires. In some embodiments, the 4-wire communications bus includes a PLC protocol on the other two wires. In some embodiments, transceiver 220 may be configured to receive the first set of data transmitted, by PLC transceiver 104, over power lines 140 and 142. In some embodiments, transceiver 220 may be configured to receive the high-speed data transmitted at a power input 222 (24 V AC input) and input 224 (Ground).

In some embodiments, controller 102 may be configured to send a second set of data to communication module 204 over communication lines 150 and 152 (Data line and Mode). In some embodiments, the second set of data may be transmitted at standard speed. For example, the second set of data may be transmitted at a speed less than 100 kbits/sec). For example, around 30 kbits/sec. In some embodiments, transceiver 204 may be configured the second set of data at a Data line and Mode inputs (226, 228). In some embodiments, controller 102 may be configured to transmit both the first high speed data set and the second standard speed data set approximately simultaneously (e.g., within milliseconds of one another). As discussed above, the present communication system of the present disclosure may be configured such that, while the PLC high-speed communications is occurring over the Power and Ground line of the 4-wire system, the low-speed RS-485 communication can also be occurring on the Data+ and Data-lines (e.g., Data line and Mode inputs (226, 228)). In some embodiments, the high speed and low speed communications may occur approximately simultaneously (e.g., within milliseconds of one another). This allows the standard HVAC wire to communicate with both RS-485 controlled equipment as well as HVAC equipment which contains PLC transceivers. This is advantageous because both high-speed HVAC equipment and RS-485 HVAC equipment can co-exist on existing wiring of the building. This may allow the upgrade of one or more components of the HVAC system (e.g., piece by piece) and maintain compatibility between the standard speed communication protocol and the new high-speed communication protocol over the existing wiring.

Figure 2:
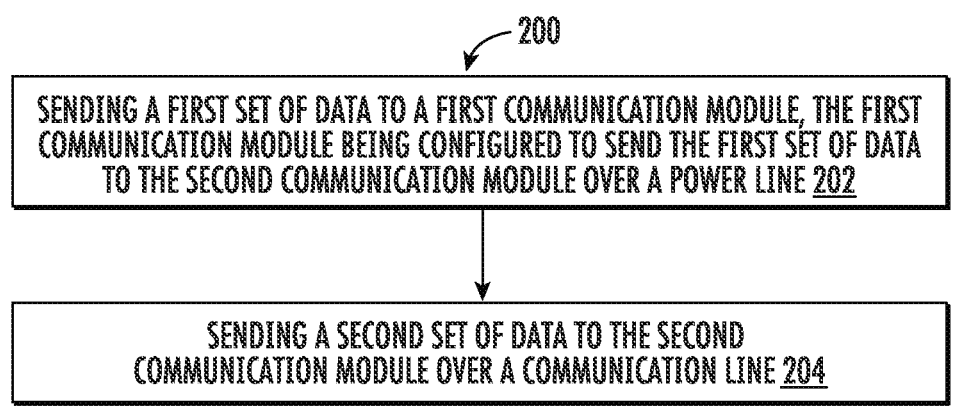
FIG. 2 shows a flow diagram illustrating an example of a method for communication between HVAC components, in accordance with one or more embodiments.

FIG. 2 shows a flow diagram illustrating an example of a method 200 for assembling a mechanical enclosure, in accordance with one or more embodiments of the present disclosure.

At an operation 202 of method 200, sending a first set of data to a first communication module, the first communication module being configured to send the first set of data to the second communication module over a power line. At an operation 204 of method 200, sending a second set of data to the second communication module over a communication line. In some embodiments, the first set and second set of information are sent approximately simultaneously (e.g., within milliseconds of one another). In some embodiments, the first set of information is transmitted at high-speed transmission rate and the second set of information is transmitted at a standard speed transmission rate. In some embodiments, the second communication module includes a serial communication bus configured to receive power and the first set of information from the first communication module over the power line. In some embodiments, the serial communication bus is a 4-wire communications bus. In some embodiments, the 4-wire communications bus includes a RS-485 protocol on two wires. In some embodiments, the 4-wire communications bus includes a PLC protocol on the other two wires. In some embodiments, the first communication module includes a power line communication (PLC) transceiver configured to transmit the first set of information to the serial communication transceiver over the power line.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A heating, ventilation, and air conditioning (HVAC) system comprising:
a first component comprising a first communication module;
a second component comprising a second communication module, the second component configured to communicate with the first component, wherein the second communication module is configured to receive a first set of information over a power line and a second set of information over a communication line, wherein the first set and second set of information are sent simultaneously.

2. The HVAC system of claim 1, wherein:
the second communication module comprises a serial communication bus configured to receive power and the first set of information from the first communication module over the power line.

3. The HVAC system of claim 2, wherein
the serial communication bus is a 4-wire communications bus comprising a RS-485 protocol on two wires.

4. The HVAC system of claim 3, wherein the 4-wire communications bus comprises a power line communication (PLC) protocol on two wires.

5. The HVAC system of claim 2, wherein the first communication module comprises a power line communication (PLC) transceiver configured to transmit the first set of information to the serial communication bus over the power line.

6. A communication system for communication between components of a heating, ventilation, and air conditioning (HVAC) system, the system comprising:
a controller;
a first communication module operatively connected to the controller; and
a second communication module operatively connected to the controller and the first communication module, wherein the controller is configured to:
send a first set of information to the first communication module, the first communication module being configured to send the first set of information to the second communication module over a power line; and
send a second set of information to the second communication module over a communication line,
wherein the first set and second set of information are sent simultaneously.

7. The communication system of claim 6, wherein:
the second communication module comprises a serial communication bus configured to receive power and the first set of information from the first communication module over the power line.

8. The communication system of claim 7, wherein
the serial communication bus is a 4-wire communications bus comprising a RS-485 protocol on two wires.

9. The communication system of claim 8, wherein the 4-wire communications bus comprises a power line communication (PLC) protocol on two wires.

10. The communication system of claim 7, wherein
the first communication module comprises a power line communication (PLC) transceiver configured to transmit the first set of information to the serial communication bus over the power line.

11. A method for communication between components of a heating, ventilation, and air conditioning (HVAC) system, the method comprising:
sending a first set of information to a first communication module, the first communication module being configured to send the first set of information to a second communication module over a power line; and
sending a second set of information to the second communication module over a communication line, wherein the first set and second set of information are sent simultaneously.

12. The method of claim 11, wherein
the second communication module comprises a serial communication bus configured to receive power and the first set of information from the first communication module over the power line.

13. The method of claim 12, wherein:
the serial communication bus is a 4-wire communications bus comprising a RS-485 protocol on two wires.

14. The method of claim 12, wherein:
the first communication module comprises a power line communication (PLC) transceiver configured to transmit the first set of information to the serial communication bus over the power line.

15. The method of claim 14, wherein
the first set of information is transmitted at high-speed transmission rate and the second set of information is transmitted at a standard speed transmission rate.

* * * * *